(12) United States Patent
Schumacher (10) Patent No.: US 12,253,052 B2
(45) Date of Patent: Mar. 18, 2025

(54) INJECTOR SLEEVE FOR AN INJECTOR, AND BLOWING DEVICE AND INTERNAL COMBUSTION ENGINE

(71) Applicant: Daimler Truck AG, Leinfelden-Echterdingen (DE)

(72) Inventor: Moritz Schumacher, Schorndorf (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 0 days.

(21) Appl. No.: 18/251,091

(22) PCT Filed: Sep. 17, 2021

(86) PCT No.: PCT/EP2021/075554
§ 371 (c)(1),
(2) Date: Apr. 28, 2023

(87) PCT Pub. No.: WO2022/089832
PCT Pub. Date: May 5, 2022

(65) Prior Publication Data
US 2023/0374955 A1    Nov. 23, 2023

(30) Foreign Application Priority Data

Oct. 30, 2020    (DE) ..................... 10 2020 006 653.4

(51) Int. Cl.
*F02M 21/02*    (2006.01)
*F02M 53/04*    (2006.01)

(52) U.S. Cl.
CPC .... *F02M 21/0281* (2013.01); *F02M 21/0275* (2013.01); *F02M 53/043* (2013.01); *F02M 2200/858* (2013.01)

(58) Field of Classification Search
CPC ...... F02M 61/14; F02M 61/16; F02M 61/166; F02M 61/168; F02M 61/18;
(Continued)

(56) References Cited

U.S. PATENT DOCUMENTS 10,598,130 B2    3/2020    Niessner et al.
10,605,213 B2 *  3/2020    Peters .................. F02M 55/004
(Continued)

FOREIGN PATENT DOCUMENTS

DE    10 2016 217 203 A1    3/2018
DE    10 2017 213 737 A1    2/2019
(Continued)

OTHER PUBLICATIONS

PCT/EP2021/075554, International Search Report dated Jan. 3, 2022 (Two (2) pages).

*Primary Examiner* — Logan M Kraft
*Assistant Examiner* — Johnny H Hoang
(74) *Attorney, Agent, or Firm* — Crowell & Moring LLP (57) ABSTRACT

An injector sleeve for an injector for introducing a gaseous fuel into a combustion chamber of an internal combustion engine includes an intake in which the injector is at least partially receivable. A lateral surface on an external periphery has a longitudinal region around which a coolant flowing through a cooling chamber of the internal combustion engine is flowable. A sealing region connected to the longitudinal region seals the combustion chamber from the cooling chamber. A cap is arrangeable in the combustion chamber and the cap has a flow opening where gaseous fuel flowing out of the injector is directly flowable through the cap for shaping a jet of the gaseous fuel.

8 Claims, 2 Drawing Sheets

(58) Field of Classification Search
CPC ............. F02M 2200/858; F02M 21/02; F02M 21/0281; F02M 21/0275; F02M 21/043
USPC ..................................... 123/294, 470, 195 A
See application file for complete search history.

(56) References Cited

U.S. PATENT DOCUMENTS

| | | | |
|---|---|---|---|
| 11,566,580 B1* | 1/2023 | Rexavier | ................... F01P 3/16 |
| 11,781,469 B2* | 10/2023 | Heher | ................. B01F 25/3142 |
| | | | 123/445 |
| 2003/0102389 A1* | 6/2003 | Clarke | ................ F02B 23/0669 |
| | | | 239/533.3 |
| 2012/0217323 A1* | 8/2012 | Martinsson | .......... F02M 61/166 |
| | | | 72/342.2 |
| 2016/0003117 A1 | 1/2016 | Cook | |
| 2016/0160742 A1* | 6/2016 | Willi | ....................... F02P 5/045 |
| | | | 123/445 |
| 2017/0051713 A1 | 2/2017 | Peters et al. | |
| 2018/0142654 A1* | 5/2018 | Fritz | ..................... F02M 53/08 |

FOREIGN PATENT DOCUMENTS

| | | |
|---|---|---|
| DE | 10 2017 218 527 A1 | 4/2019 |
| DE | 10 2017 129 056 A1 | 6/2019 |
| WO | WO 2014/064330 A1 | 5/2014 |

\* cited by examiner

INJECTOR SLEEVE FOR AN INJECTOR, AND BLOWING DEVICE AND INTERNAL COMBUSTION ENGINE

BACKGROUND AND SUMMARY OF THE INVENTION

The invention relates to an injector sleeve for an injector. The invention further relates to an injection device having such an injector sleeve and an internal combustion engine having such an injection device.

DE 10 2017 213 737 A1 discloses an injector for injecting gaseous fuel into a combustion chamber of a combustion engine, having a nozzle body in which a pressure chamber is formed that can be filled with gaseous fuel at an injection pressure and from which an injection opening through which the gaseous fuel can flow out proceeds. A deflection body is arranged in front of the injection opening such that at least a part of the gas jet flowing out hits the deflection body and the gas jet flowing out is thus fanned out. A disadvantage of this injector is the insufficient cooling of the nozzle body.

A fuel injector for introducing a fuel can be taken as known from DE 10 2016 217 203 A1. The fuel injector comprises a valve seat arranged on an injector body, at least one injection opening provided in the injector body, a closing element that releases and closes the at least one injection opening on the valve seat, and a cooling device equipped to cool the injector body in an end region having the injection opening in a targeted manner. The jet conditioning of the fuel should be seen as a disadvantage of this fuel injector.

The object of the present invention is to create an injector sleeve, an injection device and an internal combustion engine such that the injector sleeve can be particularly advantageously cooled.

A first aspect of the invention relates to an injector sleeve for an injector for introducing, in particular injecting, a gaseous fuel into a combustion chamber of an internal combustion engine. This means that the gaseous fuel is introduced, in particular injected, into the combustion chamber by means of the injector. The gaseous fuel is hydrogen, for example. The injector sleeve formed separately from the injector has an intake in which the injector can be at least partially received. The injector sleeve comprises a lateral surface on the external periphery. The lateral surface on the external periphery has a longitudinal region around the external periphery of which a coolant flowing through at least one cooling chamber of the internal combustion engine can flow. In particular, the preferably liquid coolant can flow directly around the longitudinal region, and thus be in direct contact with it. Furthermore, the lateral surface on the external periphery has at least one sealing region connected to the longitudinal region that is designed to seal the combustion chamber from a liquid chamber. The liquid chamber is the cooling chamber, for example.

It is provided according to the invention that in order to be able to cool the injector sleeve particularly advantageously, the injector sleeve has a cap that can be or is arranged in the combustion chamber. The cap has at least or exactly one flow opening that can be flowed through directly by the gaseous fuel flowing out of the injector for shaping a jet of the gaseous fuel. In particular, the cap can have at least one further or several further flow openings, wherein the previous and following embodiments for the at least or exactly one flow opening can be applied to the respective further flow opening and vice versa. The feature that the gaseous fuel flowing out of the injector can flow directly through the flow opening should in particular be understood as follows: The cap of the injector sleeve has a wall region, for example, which directly delimits the flow opening, in particular completely surrounding the flow opening in the peripheral direction of the flow opening. At least part of the gaseous fuel flowing out of the injector thus comes into direct contact with at least part of the wall region. In particular, the fuel flowing through the flow opening forms a fuel jet also simply described as a jet, which exits the flow opening or exits the cap via the flow opening and thus flows, in particular directly, into the combustion chamber, for example. As the jet or the gaseous fuel forming the jet flows directly through the flow opening and comes into direct contact with the wall region, the jet is shaped by means of the flow opening or by means of the wall region. This should in particular be understood to mean that the flow opening or the wall region impresses a shape on the jet or causes a shape of the jet. In other words, the flow opening or the wall region causes a shape of the jet. This also means, for example, that the shape of the jet is dependent on the flow opening, in particular on its geometry or shape. In other words, a shape of the jet results from a shape of the flow opening, in particular on its internal periphery.

For example, the injector has at least or exactly one exit opening, out of which the gaseous fuel flows or via which the gaseous fuel that flows through the injector flows out of the injector. After the gaseous fuel has flowed out of the exit opening, the gaseous fuel flows through the flow opening of the cap in particular protruding into the combustion chamber or leading into the combustion chamber. This means that, on its flow path from the injector into the combustion chamber, the gaseous fuel first flows through the exit opening of the injector and thus flows out of the injector, and then flows through the flow opening of the cap, such that the flow opening is arranged downstream of the exit opening of the injector in the flow direction of the gaseous fuel from the injector into the combustion chamber. In this process, the flow opening forms the jet which is used to inject the gaseous fuel into the combustion chamber. In particular, the flow opening is the last opening through which the fuel flows before it flows into the combustion chamber.

The invention is in particular based on the following knowledge and considerations: In conventional internal combustion engines able to be operated by means of a gaseous fuel, and also described as gas engines, in particular in the case of those using direct injection, in which the gaseous fuel is injected directly into the combustion chamber, the injector has an in particular switchable valve, by means of which a flow of the fuel into the combustion chamber or through the injector is adjusted, in particular controlled or regulated. The injector itself usually has a suitable geometry for shaping a jet. This means that the injector itself has a suitable geometry that shapes at least one or several jets of the fuel, also described as gas jets. The geometry for shaping a jet is also described as jet-shaping geometry, and is for example the last geometry or the last opening through which the fuel flows before it flows into the combustion chamber forming a fuel jet. This geometry for shaping a jet is usually and as a rule formed by an injection cap or nozzle cap on a point of the injector also described as an injector point, wherein when an injector sleeve designed separately from the injector and also described as a water protection sleeve is usually used, in which the injector is received, the injector, in particular its point, and so the geometry for shaping a jet, protrudes out of the injector sleeve, in particular in the axial direction of the injector sleeve or in the longitudinal extension direction of the injector sleeve and of the injector. Thus, the geometry for shaping a jet is usually not formed by the injector sleeve, but by the injector itself. The switchable valve of the injector can be arranged in a housing of the injector and/or be designed as an outward-opening poppet valve or umbrella valve or an inward-opening needle valve. A mixture comprising the fuel and air is burned in the combustion chamber. Surfaces of the valve and the jet-shaping geometry in the combustion chamber absorb a lot of heat during the combustion, which should be emitted to a cylinder head on which the injector sleeve and the injector are held, or to the coolant, which is also described as a cooling medium and is preferably liquid, to avoid an excessively high surface temperature. A high surface temperature can lead to the loss of desired mechanical properties, corrosion or oxidation and to premature ignition of the mixture in the combustion chamber. Each of these cases can lead to a limitation of the function of and damage to the internal combustion engine if no corresponding countermeasures are taken. In particular when hydrogen is used as a fuel, the surfaces in the combustion chamber are subjected to a high heat load, as hydrogen has a very high heat conductivity and the hydrogen flame burns very close to the surfaces.

Further knowledge forming the basis of the invention is that a small air gap should usually be present between a cylindrical part of the injector point and the water protection sleeve so that the injector can be mounted. The heat conduction through this air gap is insignificantly small. In order to guide the heat from the cap also described as an injection cap or nozzle cap and usually provided on the injector point into the cylinder head or the coolant, the heat must conventionally be guided through an injector shaft or an injector housing to a contact surface between the injector shaft or injector housing and the water protection sleeve. Direct contact of the injector with the cooling medium would reduce the problem, but is usually avoided to simplify mounting. Displacing the contact surface between the injector shaft or injector housing and the water protection sleeve closer to the injection point would also serve to improve removal of the heat, but the injector shaft is designed cylindrically and as thinly as possible on the point due to the limited installation space and to enable to injector to be mounted without issue.

In order to be able to advantageously cool the injector sleeve and, via the latter, the injector, it is provided according to the invention that the jet-shaping geometry is formed by the injector sleeve designed separately from the injector and provided in addition to the latter, or is designed in the injector sleeve. Heat introduced into the cap of the injector sleeve also described as an injection cap or nozzle cap can thus be particularly advantageously diverted to the coolant, in particular via the longitudinal region around which the coolant (cooling medium) flows or circulates directly. The sealing region can ensure that no liquid from the liquid chamber, in particular no coolant from the cooling chamber, penetrates into an undesirable region, e.g., the combustion chamber. Using the injector sleeve designed separately from the injector and provided in addition to the latter additionally enables the injector to be mounted particularly easily and the cooling chamber or the liquid chamber to be advantageously sealed. In this respect, it can for example be provided that, when the internal combustion engine, also described as a gas engine, is produced, the injector sleeve is first arranged in a state in which the injector is spaced apart and separated from the injector sleeve and not in the injector sleeve, is mounted on a component such as for example the previously specified cylinder head, in particular such that the cooling or liquid chamber is sealed for example from the previously specified region, in particular from the combustion chamber by means of the sealing region. Subsequently, i.e., after the injector sleeve is mounted on the component in particular separately from the injector or independently from the injector, the injector is mounted, for example such that the injector is at least partially arranged in the injector sleeve. For this purpose, the injector is for example at least partially inserted into the injector sleeve in the longitudinal extension direction of the injector sleeve.

The intake of the injector sleeve is preferably a through opening and/or can be designed as a drilled hole. The injector sleeve is also described as a water protection sleeve, as it is used to seal regions such as the combustion chamber, the cooling chamber or the liquid chamber, and in some instances a further oil chamber from one another. For this purpose, sealing elements are used, for example, which are designed separately from the injector sleeve and separately from the cylinder head, and abut or are supported directly on the cylinder head on one side and directly on the injector sleeve, in particular on its lateral surface on the external periphery on the other side. The intake is an internal geometry or has an internal geometry that serves to at least partially receive the injector. For example, a sealing element between the injector and the water protection sleeve, in particular in the intake, seals the combustion chamber from an interior chamber or a region of the intake of the water protection sleeve, wherein the region of the intake can be arranged above the injector or on a side of the sealing element facing away from the combustion chamber. The water protection sleeve thus makes it possible to mount the injector from the oil chamber or from outside a cylinder head cover. To introduce the gas forces acting on the surfaces of the water protection sleeve and of the injector on the combustion chamber side into a structure of the cylinder head, screw threads or clamps are used, for example. If sealing elements are used, which require a pre-tensioning force to function properly, this pre-tensioning force can likewise be applied via the screw threads or the clamps.

In an advantageous embodiment of the invention, it is provided that at least the longitudinal region is formed by a wall of the injector sleeve, wherein the wall is designed as one part with the cap. In other words, at least the wall of the injector sleeve having the longitudinal region and the cap are formed by a one-part component. This embodiment has the advantage that the heat of the cap can be particularly effectively diverted away from the cap. For example, the wall forms or comprises the previously specified wall region delimiting the flow opening.

In a further advantageous embodiment of the invention, it is provided that the sealing region is also formed as one part with the cap. In other words, at least the wall forming the longitudinal region, the sealing region and the cap are formed by a one-part component. A particularly advantageous heat transfer from the cap, via the sealing region and the wall or the longitudinal region to the coolant can thus occur, whereby the cap or the injector sleeve can be particularly advantageously cooled.

A further embodiment is characterized in that the sealing region has at least one sealing element for sealing the combustion chamber from the liquid chamber. In other words, the sealing element arranged in the sealing region seals the combustion chamber from the liquid chamber, which is in particular the cooling chamber, such that for example an undesired flow of a medium from the combustion chamber into the liquid chamber and vice versa can be avoided. This has the advantage that the medium is prevented from flowing over in the installed position of the injector sleeve.

It has proved particularly advantageous if the sealing element is a cavity in which a seal element designed separately from the injector sleeve and preferably also separately from the cylinder head can be at least partially received. For example, the cavity is a groove running in the circumferential direction of the injector sleeve, in particular completely, i.e., a ring groove, in which the seal element can be at least partially arranged. The sealing element also described as a seal element is preferably formed from an elastically deformable plastic, in particular rubber. This has the advantage that in particular high pressures can be sealed.

It has further proved advantageous if the flow opening has a through direction along which the flow opening can be flowed through by the fuel, wherein the through direction runs obliquely to the longitudinal extension direction of the injector sleeve. In other words, the flow opening is formed in a plane, wherein the through direction runs perpendicular to the plane. In particular if the flow opening is designed to be circular in shape, the through direction coincides with the axial direction of the flow opening.

A second aspect of the invention relates to an injection device for an injector for injecting a gaseous fuel into a combustion chamber of an internal combustion engine. The injection device comprises an injector that can be flowed through by gaseous fuel and an injector sleeve designed separately from the injector. The injector sleeve has an intake in which the injector is at least partially received. The injector sleeve additionally has a lateral surface on the external periphery. The lateral surface on the external periphery has a longitudinal region around the external periphery of which a coolant flowing through at least one cooling chamber of the internal combustion engine can flow. Furthermore, the lateral surface on the external periphery has at least one sealing region connected to the longitudinal region that is designed to seal the combustion chamber from a liquid chamber. The liquid chamber is the cooling chamber, for example.

The injector sleeve has a cap that can be arranged in the combustion chamber that has at least or exactly one flow opening that can be flowed through directly by the gaseous fuel flowing out of the injector for forming a jet of the gaseous fuel. The injector comprises an injector housing that has the exit opening. In other words, the injector housing forms or delimits the exit opening of the injector. The injector housing can be flowed through by the gaseous fuel. A valve element is arranged in the injector housing that can be designed as a needle, in particular as an injection needle. The valve element can in particular be moved translationally relative to the injector housing of the injector. This means that the valve element can be moved between at least one closed position and at least one open position. In the closed position, the valve element closes the exit opening of the injector. This means that no gaseous fuel can flow out in the closed position. In the open position, the valve element releases the exit opening of the injector. This means that gaseous fuel can flow through the exit opening in the open position.

It has proved particularly advantageous if the injection device has an intermediate chamber partially delimited by the injector, in particular directly, and partially by the cap, in particular directly. The intermediate chamber is arranged upstream of the flow opening and downstream of the injector in the flow direction of the fuel flowing out of the injector and through the flow opening. The injector has the previously specified exit opening via which the gaseous fuel can flow out of the injector. This means that the gaseous fuel flowing out of the injector flows out of the injector via the exit opening, such that the intermediate chamber is flowed through downstream of the exit opening and upstream of the flow opening in the flow direction of the gaseous fuel flowing through the exit opening and thus flowing out of the injector and the gaseous fuel flowing through the through opening and thus flowing out of the cap. This means that the intermediate chamber is preferably arranged downstream of the exit opening and upstream of the flow opening. This has the advantage that the injector can be mounted particularly easily in the injector sleeve due to the intermediate chamber.

A third aspect of the invention relates to an internal combustion engine for a motor vehicle. The internal combustion engine comprises the injection device. The internal combustion engine formed for example as a reciprocating piston engine has at least one combustion chamber that can for example be partially delimited by a cylinder, by a piston translationally moveably received in the cylinder and by a combustion chamber roof.

It has proved particularly advantageous if the injector has at least one or the previously specified exit opening, via which the gaseous fuel can be diverted from the injector, wherein the exit opening protrudes into the combustion chamber. This means that a part of the injector having the exit opening is arranged in the combustion chamber. This has the advantage that the gaseous fuel can reach the combustion chamber at a particularly early point in time, whereby the gaseous fuel can be burned particularly efficiently.

Further advantages, features and details of the invention result from the following description of preferred exemplary embodiments and with reference to the drawings. The features and combinations of features specified in the description, as well as the features and feature combinations of features specified below in the description of the figures and/or shown solely in the figures can be used not only in the respectively specified combination but also in other combinations or in isolation without leaving the scope of the invention.

DETAILED DESCRIPTION OF THE DRAWINGS

In the figures, identical or functionally identical elements are provided with the same reference numerals.

Figure 1:
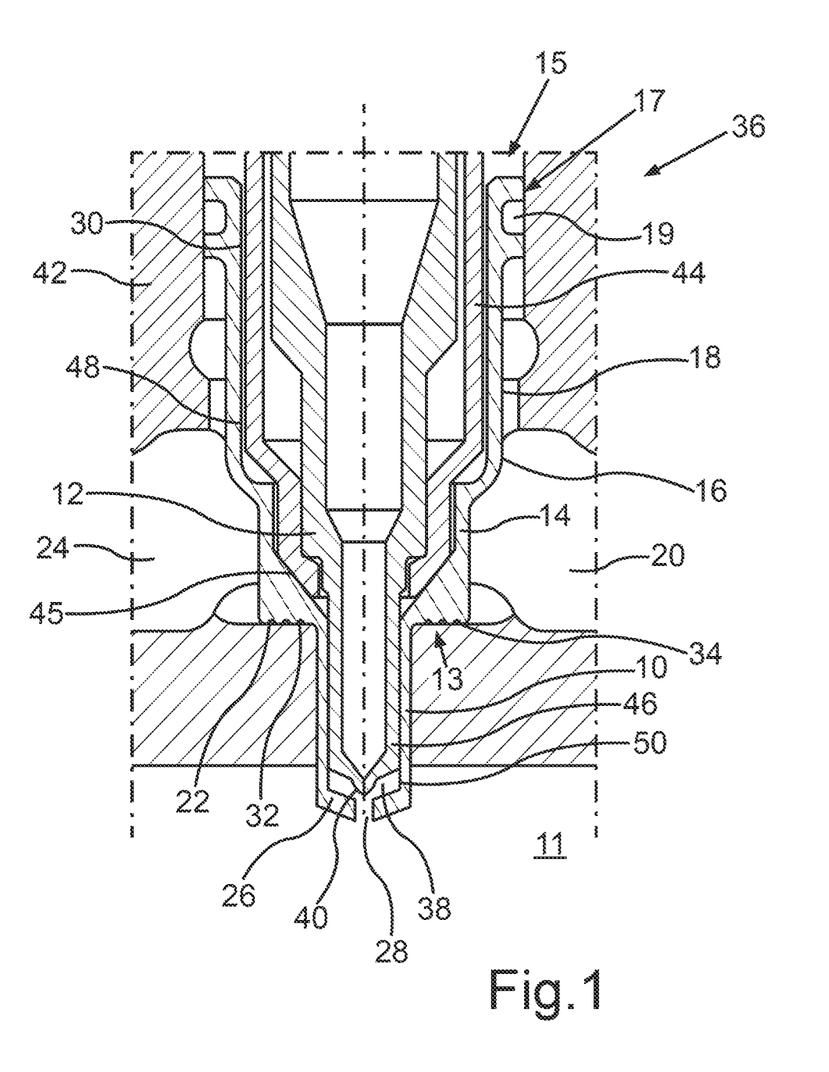
FIG. 1 shows a schematic sectional view of an injection device according to the invention according to a first embodiment.

FIG. 1 shows a first embodiment of an injection device 36 in a schematic sectional view. The injection device 36 is a component of an internal combustion engine, in particular of a motor vehicle. This means that the motor vehicle designed for example as a motor car has the internal combustion engine and can be driven by means of the internal combustion engine. The internal combustion engine has a cylinder head 42 and at least one combustion chamber. The internal combustion engine can be operated by means of a gaseous fuel, and thus a gas motor. The gaseous fuel can be injected directly into the combustion chamber by means of the injection device 36.

The injection device 36 comprises an injector 12 that can be flowed through by the gaseous fuel, and an injector sleeve 10 designed separately from the injector 12 and provided in addition to the latter that is also described as a water protection sleeve. The injector sleeve 10 has an intake 14 presently designed as a through opening, in which the injector 12 is at least partially received. The injector sleeve 10 additionally has a wall 30 preferably formed as one part. The injector sleeve 10 is preferably designed as one part. The wall 30 comprises or forms a lateral surface on the external periphery 16 and a lateral surface on the internal periphery 48. The lateral surface on the internal periphery 48 faces away from the lateral surface on the external periphery 16, in particular in the radial direction of the injector sleeve 10, i.e., along a direction perpendicular to the longitudinal extension of the injector sleeve 10. The lateral surface on the internal periphery 48 directly delimits at least a longitudinal region of the intake 14 in the peripheral direction of the injector sleeve 10 running around the longitudinal extension direction of the injector sleeve 10, surrounding it completely. In particular, the entire intake 14 is in particular directly delimited by the lateral surface on the internal periphery 48.

The lateral surface on the external periphery 16 has a longitudinal region 18 around the external periphery of which a coolant flowing through at least one cooling chamber 20 of the internal combustion engine can flow. It can be seen from FIG. 1 that the cooling chamber 20 is at least partially formed or delimited by the cylinder head 42. The cooling chamber 20 is a cooling jacket or component of a cooling jacket that can be flowed through by the coolant that is also described as a cooling medium and is preferably liquid. The coolant preferably comprises at least water, such that the coolant is also described as cooling water, the cooling chamber 20 or the liquid chamber 24 is also described as a water chamber and the cooling jacket is also described as a water jacket. The cylinder head 42 can be cooled at least in one partial region by means of the coolant. The injector sleeve 10 can additionally be cooled by means of coolant flowing directly around the longitudinal region 18, in particular via the longitudinal region 18 of the injector sleeve. This means that the coolant flows directly around the longitudinal region 18, i.e., comes into direct contact with the longitudinal region on its way through the cooling chamber 20. The longitudinal region 18 faces way from the intake 14, in particular in the radial direction of the injector sleeve 10, and thus in the radial direction of the injector 12 whose longitudinal extension direction coincides with the longitudinal extension direction of the injector sleeve 10.

Furthermore, the lateral surface on the external periphery 16 has at least one sealing region 22 connected to the longitudinal region 18 by means of which the combustion chamber described by 11 in FIG. 1 is sealed from a liquid chamber 24 or vice versa. The liquid chamber 24 is presently the cooling chamber 20. Sealing the combustion chamber 11 from the liquid chamber 24 or the cooling chamber 20 avoids the coolant reaching the combustion chamber from the cooling chamber 20 and a fluid reaching the cooling chamber 20 (liquid chamber 24) from the combustion chamber 11. The sealing region 22 follows the longitudinal region 18 in the longitudinal extension direction of the injector sleeve 10 also simply described as a sleeve. In the exemplary embodiment shown in FIG. 1, the sealing region 22 is arranged on an end face 13 of the injector sleeve 10, whose end face 13 extends in a plane that runs perpendicular to the longitudinal extension direction of the sleeve. The end face 13 faces the cylinder head 42 or a wall region of the cylinder head in the longitudinal extension direction of the sleeve, wherein at least a part of the end face 13 is supported, abuts or sits directly on the wall region in the longitudinal extension direction of the sleeve. The sealing region 22 facing the wall region of the cylinder head 42 in the longitudinal extension direction of the sleeve faces away from at least a part of the intake 14 in the longitudinal extension direction of the sleeve. The sealing region 22 has at least one or several sealing elements, wherein the sealing element is presently designed as a cavity 34. The cavity 34 preferably extends in the peripheral direction of the sleeve, surrounding it completely, and is thus designed as an annular groove, for example. In the cavity 34, a sealing element 32 designed separately from the sleeve and separately from the cylinder head 42 is partially arranged, which abuts directly on the sleeve on the one hand, and directly on the cylinder head 42 on the other hand, in particular on its wall region. The sleeve is thus sealed from the cylinder head 42, and thus the cooling chamber 20 (liquid chamber 24) is sealed from the combustion chamber.

The injector 12 comprises an injector housing 46, for example, into which the gaseous fuel can be introduced, in particular from outside of the injector 12 as a whole. The injector housing 46 can be flowed through by the gaseous fuel introduced into the injector housing 46. The injector 12, in particular the injector housing 46, has at least or exactly one exit opening 40, in particular on its point also described as an injector point, for the fuel introduced into the injector housing 46. A valve element is arranged in the injector housing 46 that can be designed for example as a needle, in particular as an injection needle. The valve element can be moved relative to the injector housing 46 of the injector 12, in particular in the longitudinal extension direction of the injector 12 and/or translationally between a closed position and at least one open position. In the closed position, the valve element 40 closes the exit opening of the injector 12. This means that no gaseous fuel can flow out of the injector 12 in the closed position. In the open position, the valve element releases the exit opening 40 of the injector 12. This means that, in the open position, gaseous fuel can flow through the exit opening 40 and thus out of the injector housing 46 and thus out of the injector 12 as a whole. 44 designates a component that can be a component of the injector 12. The component 44 can in particular be a part of the injector housing 46 or a further, in particular separate housing of the injector 12. It can be seen that the component 44 is at least partially arranged in the intake 14, and abuts directly outwardly on the sleeve in the radial direction of the injector 12 or the sleeve, in particular on the lateral surface on the internal periphery 48, and abuts inwardly directly on the injector housing 46 in the radial direction of the sleeve or of the injector 12. At least a partial region 45 of the component 44 abuts, in particular directly, on the sleeve, in particular on the lateral surface on the internal periphery 48, whereby, for example, the combustion chamber is sealed from at least a part of the intake 14 also described as an interior or interior chamber of the injector sleeve 10.

It can also be seen from FIG. 1 that the cylinder head 42 has an intake 15 in particular designed as a through opening, which leads into the cooling chamber 20 in itself, i.e., on its own. The sleeve is partially received in the intake 15. The sleeve protrudes outside of the intake 15, passes through the cooling chamber 20 and penetrates a further through opening of the cylinder head 42, wherein the further through opening passes through the wall region of the cylinder head 42. The sleeve protrudes on a side of the wall region facing away from the cooling chamber 20 out of the further through opening, and protrudes into the combustion chamber 11. The further through opening, and thus the combustion chamber 11, are sealed from the cooling chamber 20 or vice versa by means of the sealing region 22. In the longitudinal extension direction of the sleeve, a further sealing region 17 of the sleeve, in particular the lateral surface on the external periphery 16, is connected to the longitudinal region 18, pointing away from the sealing region 22, such that the sealing region 17 is arranged on a side of the longitudinal region 18 facing away from the sealing region 22 in the longitudinal extension direction of the sleeve. The sealing region 17 also has a further sealing element presently designed as a cavity 19, in particular as a groove and most particularly as an annular groove. A further sealing element is or can be received at least partially in the cavity 19, which can be designed separately from the sleeve and separately from the cylinder head, and can abut directly on the sleeve on one side and directly on the cylinder head 42 on the other. By means of the further sealing element of the sealing region 17, and by means of the further sealing element, the cooling chamber 20 (liquid chamber 24) is sealed from a further fluid chamber, for example, in particular a further liquid chamber or vice versa. The further fluid chamber is for example arranged on a side of the longitudinal region 18 or the sealing region 17 facing away from the cooling chamber 20 in the longitudinal extension direction of the sleeve. For example, the further fluid chamber can be flowed through by a further, in particular liquid medium, wherein the further fluid is preferably an oil. The further fluid chamber is thus an oil chamber, for example.

The injector 12 at least partially received in the sleeve is also partially arranged in the intake 15, passes through the cooling chamber 20 within the sleeve and passes through the further through opening of the cylinder head 42 also within the sleeve, wherein the injector 12 within the sleeve protrudes from the further through opening of the cylinder head 42 and protrudes into the combustion chamber 11 such that the exit opening 40 within the sleeve is arranged in the combustion chamber 11 or protrudes into the combustion chamber 11.

The injector sleeve 10 designed separately from the injector 12 and provided in addition to the injector 12 has a cap 26 that is arranged in the combustion chamber 11 or protrudes into the combustion chamber 11. The cap 26 is presently designed as one part with the wall 30 that forms the longitudinal region 18. The wall 30 in particular forms the lateral surface on the external periphery 16 and thus the longitudinal region 18 and preferably also the sealing regions 22 and 17. The sealing regions 22 and 17 of the longitudinal region 18 and the cap 26 are thus preferably formed as one part with one another or formed by a one-part component, in particular in the form of the sleeve.

In the first embodiment, the cap 26 has exactly one flow opening 28 that can be directly flowed through by the gaseous fuel in particular flowing out of the injector 12 via the exit opening 40 for shaping a jet of the gaseous fuel flowing out of the injector 12 and then flowing directly through the flow opening 28. This means that, on its way through the injector 12 and the sleeve into the combustion chamber 11, the fuel first flows through the injector 12 and thus the exit opening 40 and flows out of the injector 12, and only subsequently flows through the flow opening 28 and flows out of the sleeve via the flow opening 28. The gaseous fuel flowing out of the sleeve via the flow opening 28 flows directly into the combustion chamber 11. The flow opening 28 is thus arranged downstream of the in particular entire injector 12, and thus downstream of the exit opening 40 in the flow direction of the fuel.

The flow opening 28 forms or shapes the gaseous fuel flowing directly through the flow opening 28 into a fuel jet, also simply described as a jet, which flows out of the flow opening 28 or flows away from the flow opening 28 and flows into the combustion chamber 11. The fuel is thus injected directly into the combustion chamber 11. In other words, the flow opening 28 or a wall region 50 of the cap 26 directly delimiting the flow opening 28 shapes the jet penetrating into the combustion chamber 11 from the flow opening 28, whose shape thus depends on a shape of the flow opening 28, in particular on the internal periphery thereof. The flow opening 28 is thus a jet-shaping geometry that is integrated not into the injector 12 but into the injector sleeve 10. As the coolant circulates directly around the longitudinal region 18 or the wall 30 at least in the longitudinal region 18, heat introduced into the cap 26 also described as an injection cap or nozzle cap can be particularly effectively diverted to the coolant also described as a cooling medium. For liquid fuels, separating the sealing element and jet-shaping element, presently in the form of the flow opening 28, would not work, as a dead volume between these two elements would lead to problems when dosing the then liquid fuel. For gaseous fuels and in particular hydrogen, however, no such disadvantage need be feared due to the low density of the fuel.

In the first embodiment, at least a partial region of the cap 26 is arranged in the combustion chamber, such that at least the partial region of the cap 26 protrudes into the combustion chamber. The flow opening 28 is arranged in the partial region of the cap 26. This means that the flow opening 28 is arranged in the combustion chamber or protrudes into the combustion chamber. The cap 26 of the injector sleeve 10 has the wall region 50 that directly delimits the flow opening 28. If the needle releases the exit opening 40 of the injector 12 in the open position of the valve element, then the gaseous fuel can flow out of the exit opening 40 of the injector 12. At least part of the gaseous fuel flowing directly through the flow opening 28 comes into direct contact with at least part of the wall region 50. After the gaseous fuel has flowed out of the exit opening 40, the gaseous fuel flows through the flow opening 28 of the cap 26 and into the combustion chamber 11. This means that, on its flow path from the injector 12 into the combustion chamber 11, the gaseous fuel first flows through the exit opening 40 of the injector 12 and then flows through the flow opening 28 of the cap 26. Consequently, the flow opening 28 is arranged downstream of the exit opening 40 of the injector 12 in the flow direction of the gaseous fuel from the injector 12 into the combustion chamber 11.

In the present exemplary embodiment, the injection device 36 has an intermediate chamber 38 delimited, in particular respectively directly, by the injector 12 and partially by the cap 26. The intermediate chamber 38 is arranged upstream of the flow opening 28 and downstream of the exit opening 40 of the injector 12 in the flow direction of the fuel flowing out of the injector 12 and through the flow opening 28. Consequently, the gaseous fuel flowing out of the injector 12 flows out of the injector 12 via the exit opening 40, and the gaseous fuel then flows into the intermediate chamber 38 and through the intermediate chamber 38. The fuel then flows through the flow opening 28. At least a part of the gaseous fuel is in direct contact with at least a part of the wall region 50 of the injector sleeve 10. After the gaseous fuel has spread out in the intermediate chamber 38, the gaseous fuel flows through the flow opening 28, and thus out of the cap 26 into the combustion chamber.

Figure 2:
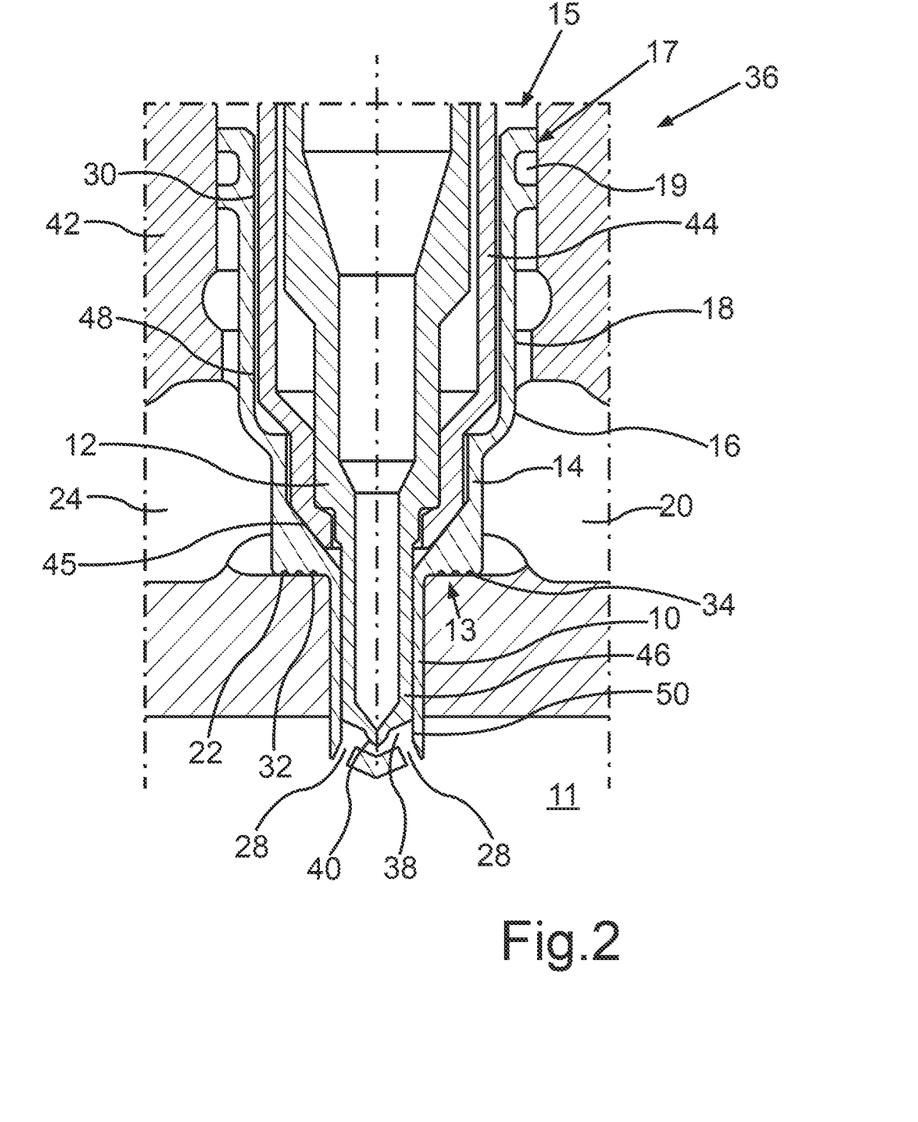
FIG. 2 shows a schematic sectional view of the injection device according to a second embodiment.

FIG. 2 shows a schematic sectional view of a second embodiment of the injection device 36. The cap 26 of the injector sleeve 10 has several, in particular at least or exactly two flow openings 28, which can be flowed through directly by the gaseous fuel flowing out of the injector 12. The flow openings 28 are preferably arranged in the partial region of the cap 26, wherein the partial region protrudes into the combustion chamber 11. This means that the flow openings 28 protrude into the combustion chamber. The needle releases the exit opening 40 of the injector 12 in the open position of the valve element, such that the gaseous fuel can flow out of the exit opening 40 of the injector 12. At least a part of the gaseous fuel can be in direct contact with at least a part of the wall region 50 of the cap 26. After the gaseous fuel has flowed out of the exit opening 40, the gaseous fuel flows through the flow openings 28 of the cap 26 and into the combustion chamber 11. Consequently, the flow openings 28 are arranged downstream of the exit opening 40 of the injector 12 in the flow direction of the gaseous fuel from the injector 12 into the combustion chamber. The flow openings 28 respectively form or shape a jet of the gaseous fuel flowing into the combustion chamber 11, and are thus respective, jet-shaping geometries that are not integrated into the injector 12 but into the injector sleeve 10, wherein the jets strike or penetrate into the combustion chamber 11 particularly favourably in the second embodiment.

In the first embodiment and in the second embodiment, the respective flow opening 28 is designed in a plane or extends in a respective plane. The respective flow opening can additionally be flowed through by the gaseous fuel along a respective through direction, wherein the through direction runs perpendicular to the plane. In the first embodiment, the plane runs perpendicular to the longitudinal extension direction of the sleeve. This means that the through direction runs in parallel to the longitudinal extension direction of the injector sleeve 10 or coincides with the longitudinal extension direction of the injector sleeve 10 in the first embodiment. In the second embodiment, however, the plane runs obliquely to the longitudinal extension direction of the sleeve. This means that the through direction runs obliquely to the longitudinal extension direction of the injector sleeve 10 in the second embodiment. It is additionally presently provided in the second embodiment that the through directions of the flow openings 28 or the planes run obliquely to one another. The through directions or the planes could run perpendicular to one another in some instances, for example.

LIST OF REFERENCE CHARACTERS 10 injector sleeve
11 combustion chamber
12 combustion chamber
13 end face
14 intake
15 intake
16 lateral surface on the external periphery
17 sealing region
18 longitudinal region
19 cavity
20 cooling chamber
22 sealing region
24 liquid chamber
26 cap
28 flow opening
30 wall
32 sealing element
34 cavity
36 injection device
38 intermediate chamber
40 exit opening
42 cylinder head
44 housing
45 partial region
46 injector housing
48 lateral surface on the internal periphery
50 wall region

The invention claimed is:

1. An injector sleeve (10) of an injector (12) for introducing a gaseous fuel into a combustion chamber of an internal combustion engine, comprising:
   an intake (14) in which the injector (12) is at least partially receivable;
   a lateral surface on an external periphery (16) that has a longitudinal region (18) around which a coolant flowing through a cooling chamber (20) of the internal combustion engine is flowable;
   a sealing region (22) connected to the longitudinal region (18) that seals the combustion chamber from the cooling chamber (20); and
   a cap (26) that is disposed in the combustion chamber or protrudes into the combustion chamber and that has a flow opening (28), wherein gaseous fuel flowing out of the injector (12) is directly flowable through the cap (26) for shaping a jet of the gaseous fuel and wherein the flow opening (28) is disposed downstream of an entirety of the injector (12), and thus, downstream of an exit opening (40) of the injector (12) in a flow direction of the gaseous fuel;
   wherein at least the longitudinal region (18) is formed by a wall (30) of the injector sleeve (10) and wherein the wall (30) is designed as one part with the cap (26).

2. The injector sleeve (10) according to claim 1, wherein the sealing region (22) is also designed as one part with the cap (26).

3. The injector sleeve (10) according to claim 1, wherein the sealing region (22) has a sealing element (32) for sealing the combustion chamber from the cooling chamber (20).

4. The injector sleeve (10) according to claim 3, wherein the sealing element (32) is a cavity (34) in which a seal element is at least partially receivable.

5. The injector sleeve (10) according to claim 1, wherein the flow opening (28) has a through direction along which the flow opening (28) is flowable through by the gaseous fuel and wherein the through direction runs obliquely to a longitudinal extension direction of the injector sleeve (10).

6. An injection device (36) for injecting a gaseous fuel into a combustion chamber of an internal combustion engine, comprising:
   an injector (12), wherein the gaseous fuel is flowable through the injector (12); and
   an injector sleeve (10), wherein the injector sleeve (10) is designed separately from the injector (12);
   wherein the injector sleeve (10) comprises:
      an intake (14) in which the injector (12) is at least partially receivable;
      a lateral surface on an external periphery (16) that has a longitudinal region (18) around which a coolant flowing through a cooling chamber (20) of the internal combustion engine is flowable;
      a sealing region (22) connected to the longitudinal region (18) that seals the combustion chamber from the cooling chamber (20); and a cap (26) that is disposed in the combustion chamber or protrudes into the combustion chamber and that has a flow opening (28), wherein gaseous fuel flowing out of the injector (12) is directly flowable through the cap (26) for shaping a jet of the gaseous fuel and wherein the flow opening (28) is disposed downstream of an entirety of the injector (12), and thus, downstream of an exit opening (40) of the injector (12) in a flow direction of the gaseous fuel;

wherein at least the longitudinal region (18) is formed by a wall (30) of the injector sleeve (10) and wherein the wall (30) is designed as one part with the cap (26).

7. The injection device (36) according to claim 6, further comprising an intermediate chamber (38) delimited partially by the injector (12) and partially by the cap (26), wherein the intermediate chamber is disposed upstream of the flow opening (28) and downstream of the injector (12) in the flow direction of the gaseous fuel.

8. An internal combustion engine for a motor vehicle, comprising:

an injection device (36);

wherein the injection device (36) comprises:

an injector (12), wherein gaseous fuel is flowable through the injector (12); and an injector sleeve (10), wherein the injector sleeve (10) is designed separately from the injector (12);

wherein the injector sleeve (10) comprises:

an intake (14) in which the injector (12) is at least partially receivable;

a lateral surface on an external periphery (16) that has a longitudinal region (18) around which a coolant flowing through a cooling chamber (20) of the internal combustion engine is flowable;

a sealing region (22) connected to the longitudinal region (18) that seals the combustion chamber from the cooling chamber (20); and a cap (26) that is disposed in the combustion chamber or protrudes into the combustion chamber and that has a flow opening (28), wherein gaseous fuel flowing out of the injector (12) is directly flowable through the cap (26) for shaping a jet of the gaseous fuel and wherein the flow opening (28) is disposed downstream of an entirety of the injector (12), and thus, downstream of an exit opening (40) of the injector (12) in a flow direction of the gaseous fuel;

wherein at least the longitudinal region (18) is formed by a wall (30) of the injector sleeve (10) and wherein the wall (30) is designed as one part with the cap (26).

* * * * *